…

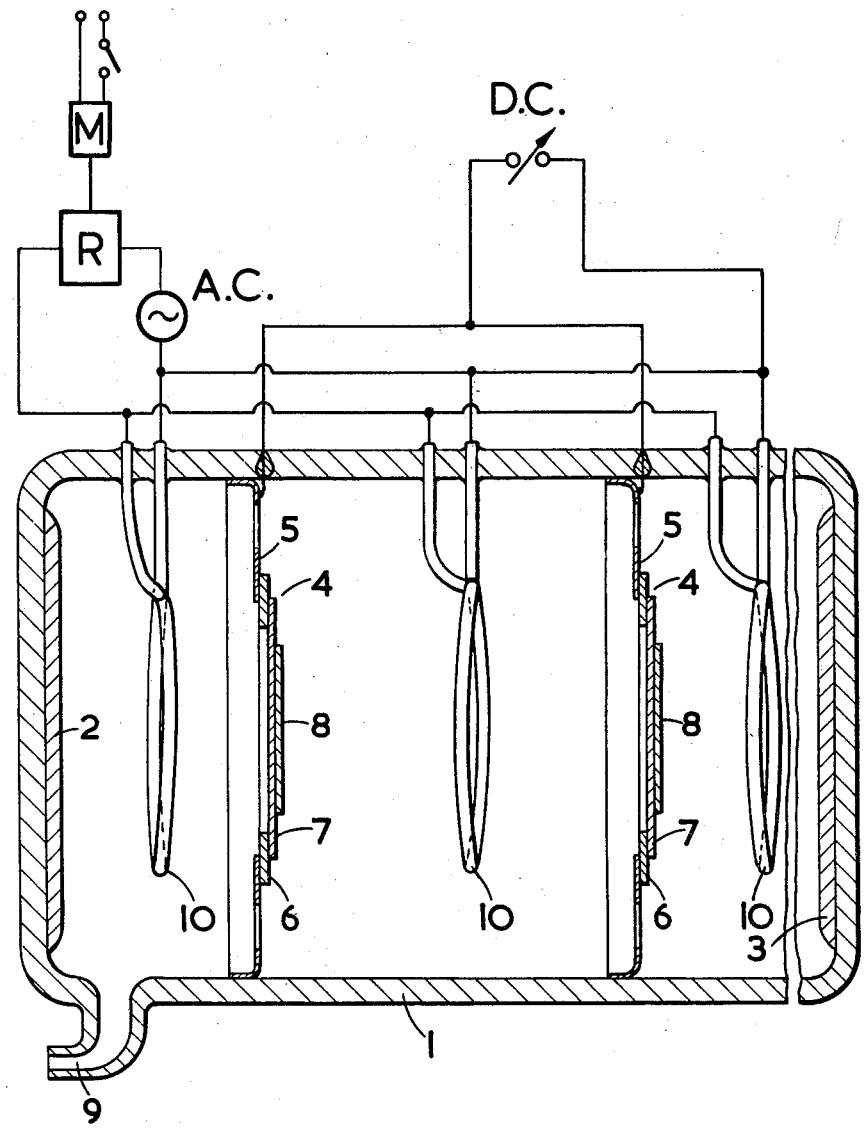

3,159,442
PRODUCTION OF THIN FILMS
William Leslie Wilcock, East Molesey, England, assignor to National Research Development Corporation, London, England, a British corporation
Filed Mar. 13, 1961, Ser. No. 95,189
Claims priority, application Great Britain Mar. 17, 1960
7 Claims. (Cl. 316—8)

This invention relates to the production of thin films, and is particularly concerned with the production of thin films on substrates which are themselves thin films. An example of such composite films is the film-type dynode for use in photo-electric image tubes in which a thin supporting substrate, for instance an aluminium oxide film, is supported on a suitable frame and a film of emissive material having good secondary electron emission properties, for instance potassium chloride, is deposited thereon.

It is common practice to produce thin films by evaporation of the film material on to a substrate surface, and this method is applicable to the production of films on fragile substrates, for example substrates which are themselves in the form of thin films. It has been found, however, that on heating and subsequent cooling, some such evaporated films do not return to their original size but show a significant contraction. This has the effect, where the film is supported on a fragile substrate which is itself supported on a frame, of setting up stresses in the substrate which may cause the substrate to tear or detach itself from the supporting frame. The explanation of this contraction effect is not clear, but it is probably due to molecular readjustments taking place within the evaporated film.

An example where this effect is of importance is in the production of dynodes as hereinbefore described. Thus, in one form of such dynodes, a potassium chloride film is deposited upon the surface of an aluminium oxide substrate supported on an annular frame. It is necessary during the subsequent preparation of the tube in which the dynode is mounted to bake it, with the dynodes already in position inside it, and on subsequent cooling the potassium chloride film returns to a smaller size than it was originally, and the substrate may consequently be ruptured.

According to the invention, therefore, there is provided a method of relieving stresses in a thin film supported on a fragile subtrate caused by contraction of the film relative to the substrate comprising subjecting the said film to electron bombardment having sufficient energy to penetrate the film and sufficient density to relieve the stresses.

The method is applicable to the relieving of stresses in a thin evaporated film deposited upon a fragile substrate supported on a supported frame, the stresses being caused by an overall contraction of the film relative to the fragile substrate on being subjected to a heating and cooling cycle. One such application of the invention, is to the relieving of stresses in the emissive film of a film-type dynode suitable for use in a photo-electric image tube, such dynodes comprising an emissive film deposited upon an electron-permeable fragile substrate supported upon a frame. The material most commonly used for the emissive film is potassium chloride, and one combination of materials for a dynode is that of a potassium chloride film deposited upon a thin electron-transparent substrate of aluminium oxide supported upon an annular glass frame.

When the stresses to be relieved are caused by the film being subjected to a heating and cooling cycle, as for instance when the film is part of a film-type dynode which is subjected to the baking temperatures at which the image tube is treated with the dynode mounted in position in it, the film is preferably subjected to bombardment during the cooling part of the cycle. Thus, the film may be continuously bombarded during cooling, the energy and density of the bombardment being at least sufficient to relieve the stresses as they are formed. If desired, the intensity of bombardment can be matched to the rate of cooling of the film so as to ensure that this is in fact the case. Alternatively, in cases where the rate of stress formation bears an approximately linear relationship to the rate of cooling, it will usually be possible to select a particular energy and density of bombardment which, when continuously applied, are satisfactory for relieving stresses as they are formed throughout the cooling time.

The energy and density of bombardment which is suitable depends in general upon such variables as the material of which the film is made, and the thickness and contraction characteristics of the film. In the cases where the development of stress in the film occurs during cooling, the contraction characteristics depend upon the rate of cooling, and therefore, where the bombardment is to be carried out continuously during cooling so as to relieve the stresses as they are formed, the bombardment to be used will depend upon the thickness of the film and the rate of cooling. Thus the thicker the film, the greater the energy of bombardment required to penetrate it and the higher the temperature and the faster the rate of cooling, the greater the density of bombardment required to relieve the stresses therein. It is in general possible to see whether or not a film is under stress by its appearance, and it is therefore in practice a relatively simple matter to vary the energy and density of the bombardment until it is observed that the stresses are being adequately relieved. In any case it is unlikely that harm would be caused by moderate over-bombardment of the film.

The invention will now be described with reference to a particular example thereof as applied to an image intensifier tube, illustrated in the accompanying drawing, wherein is shown the tube in the process of manufacture having mounted in it film-type dynodes and means for applying the method of the invention to these dynodes.

A cylindrical image intensifier tube 1 has situated at opposite ends thereof a photocathode 2 and a fluorescent screen 3. Film-type dynodes 4 are mounted at intervals along the tube within annular metal plates 5 which are secured to the wall of the tube and are electronically connected to the outside of the tube via platinum tape sealed into the wall of the tube. (For purposes of illustration only two dynodes are shown in the drawing and the thickness of the dynode films has been greatly exaggerated.) The dynodes take the form of glass annular frames 6 across which are supported electron-permeable aluminium oxide substrates 7, on which in turn are deposited potassium chloride films 8.

In use, an optical image is focussed on the photocathode 2 of the evacuated tube 1, and the electron image thus generated is itself focussed on the first dynode by means of an electron lens situated outside the tube and not shown in the drawing. Secondary electrons are liberated from the potassium chloride film 8 of the dynode, and these electrons are in turn focussed on to the next dynode, and so on down the tube until the final intensified image is formed on the fluorescent screen 3. The passage of electrons down the tube is controlled by the application of a potential gradient along the length of the tube via the dynodes themselves (and also auxiliary electrodes situated between dynodes and not shown in the drawing).

During manufacture, the image intensifier tube is evacuated through the outlet pipe 9 and baked at a temperture of about 300° C. to expel any air trapped in the walls and fittings of the tube. The outlet pipe 9 is then sealed off, and the tube allowed to cool.

It is during this cooling that the potassium chloride films 8 shrink to a smaller size than before baking, with the result that stresses are set up in the films and the aluminium oxide substrates 7 which can result in the substrates tearing away from the glass frames 6. Accordingly, split ring cathodes 10 are provided at either side of each dynode, the ring diameters being large enough to avoid interference with the electron path from the photocathode 2 to the fluorescent screen through the electron-permeable films of the dynodes 4. The ring cathodes 10 are made of a material which emits electrons on heating e.g. tungsten wire, and are connected to the outside of the tube via platinum tapes which are sealed into the walls of the tube and provide electrical contact with the outside of the tube. In the drawing they take the form of looped tungsten wires. Thus, in order to relieve stresses in the film, a variable voltage is applied between the cathodes 10 and the dynodes 4 by means of the circuitry shown in the drawing, and the cathodes 10 are heated by means of an A.C. current passed through them so as to promote the emission of electrons which the applied voltage causes to bombard the potassium chloride films 8. As the substrates 7 are electron-permeable each film 8 is bombarded on both sides.

The bombardment is preferably carried out during the cooling of the film, but can if required be carried out after the firm has cooled provided of course that the substrate has not already ruptured. Thus, stresses in a cooled potassium chloride film 500 A. thick due to baking at 300° C. have been relieved by bombardment using a voltage of 5 kv. and a current density of $10^{-8}$ amps./sq. in. for 1 hour.

The energy of the bombardment is controlled by varying the voltage applied between the dynodes 4 and the split ring cathode 10, and the density is controlled by adjustment of the variable resistance R so that it has sufficient energy to penetrate the films 8 and sufficient density to relieve the stresses in the films as they are formed. The variable resistance R is shown in the drawing as controlled by the motor M so that, when the bombardment is carried out during cooling, the motor M can be energised so as to drive the resistance R at a rate which varies the density of the bombardment appropriately according to the rate of cooling of the tube. In cases where the variable resistor is not automatically controlled, it is a simple matter to step up the current if signs of stress are seen in the film.

It will be appreciated that the method described illustrates only one method of subjecting a dynode to an electron bombardment, and that other such methods exist. For instance, in cases where dynodes are included in tubes already containing a source of electrons, e.g. an electron gun, that source may itself be used to generate the bombarding electrons. The method described involves the bombardment of the film from both sides and, although this is desirable as it cuts down the energy of bombardment required, it is not essential.

I claim:

1. A method of relieving stresses in a thin film supported on a fragile substrate caused by contraction of the film relative to the substrate comprising subjecting the said film to electron bombardment having sufficient energy to penetrate the film and sufficient density to relieve the stresses during the time in which the relative contraction is taking place.

2. A method of relieving stresses in a thin evaporated film deposited upon a fragile substrate supported on a supporting frame, the stresses being caused by an overall contraction of the film relative to the fragile substrate on being subjected to a heating and cooling cycle, comprising the step of subjecting the said film to electron bombardment having sufficient energy to penetrate the film and sufficient density to relieve the stresses during the cooling of the film.

3. In a method of preparing a photo-electric image tube in which is mounted at least one film-type dynode comprising the steps of evacuating, baking, sealing and then cooling the said tube, the step of relieving the stresses in the emissive film or films of the dynode or dynodes of the tube during production of the tube by subjecting the said film or films to electron bombardment having sufficient energy to penetrate the film or films and sufficient density to relieve the stresses therein.

4. A method of relieving stresses in a transmission-type dynode, said dynode comprising a frame, an electron-permeable fragile substrate supported upon said frame and a thin, emissive film deposited upon said substrate and said stresses being caused by contraction of said emissive film relative to said substrate when said dynode is subjected to a heating and cooling cycle, which comprises subjecting said emissive film to electron bombardment, having sufficient energy to penetrate said emissive film and sufficient density to relieve the stresses in it, during the cooling of said dynode.

5. A method of relieving stresses in a transmission-type dynode, said dynode comprising a frame, an electron-permeable fragile substrate of aluminum oxide supported upon said frame and a thin, emissive film of potassium chloride deposited upon said substrate and said stresses being caused by contraction of said emissive film relative to said substrate when said dynode is subjected to a heating and cooling cycle, which comprises subjecting said emissive film to electron bombardment, having sufficient energy to penetrate said emissive film and sufficient density to relieve the stresses in it, during the cooling of said dynode.

6. A method of relieving stresses in a transmission-type dynode, said dynode comprising a frame, an electron-permeable fragile substrate supported upon said frame and a thin, emissive film deposited upon said substrate and said stresses being caused in said emissive film by contraction of said emissive film relative to said substrate when said dynode is subjected to a heating and cooling cycle, which comprises subjecting said emissive film to continuous electron bombardment during cooling, the energy and density of said electron bombardment being at least sufficient to relieve the stresses in the emissive film as they are formed.

7. A method according to claim 6 wherein the energy and density of the electron bombardment are matched to the rate of cooling of said emissive film of said dynode whereby said bombardment is kept at least sufficient to relieve the stresses in said emissive film as they are formed.

References Cited in the file of this patent

UNITED STATES PATENTS

| | | |
|---|---|---|
| 2,171,224 | Rose | Aug. 29, 1939 |
| 2,205,055 | Zworykin et al. | June 18, 1940 |
| 2,431,401 | Janes | Nov. 25, 1947 |
| 2,810,360 | Knoll et al. | Jan. 20, 1959 |
| 2,984,534 | Kallweit et al. | May 16, 1961 |
| 3,043,974 | McGee | July 10, 1962 |